US012793315B1

(12) United States Patent
Jang et al.

(10) Patent No.: US 12,793,315 B1
(45) Date of Patent: Nov. 10, 2026

(54) GENERATING VIDEOS OF ITEMS WITH ANIMATED BACKGROUNDS USING MACHINE LEARNING

(71) Applicant: Amazon Technologies, Inc., Seattle, WA (US)

(72) Inventors: Wondong Jang, Redmond, WA (US); Jinhua Wang, St Albans (GB); Urwa Muaz, London (GB); Santhosh Mani, London (GB); Baris Gecer, London (GB); Walterio Wolfgang Mayol Cuevas, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 150 days.

(21) Appl. No.: 18/676,045

(22) Filed: May 28, 2024

(51) Int. Cl.
*G06T 13/80* (2011.01)
*G06T 7/194* (2017.01)

(52) U.S. Cl.
CPC .............. *G06T 13/80* (2013.01); *G06T 7/194* (2017.01)

(58) Field of Classification Search
CPC ...................................................... G06T 13/80
See application file for complete search history.

(56) References Cited

U.S. PATENT DOCUMENTS

2025/0069190 A1* 2/2025 Lindmark ................. G06T 7/11
2025/0285343 A1* 9/2025 Li ........................... G06T 11/60

OTHER PUBLICATIONS

Amazon.com, "Amazon Rolls Out AI-powered Image Generation to Help Advertisers Deliver a Better Ad Experience for Customers," Available online at: https://www.aboutamazon.com/news/innovation-at-amazon/amazon-ads-ai-powered-image-generator, Oct. 25, 2023, pp. 1-3.
Amazon.com, "Sponsored Brands Video Creative," Available online at: https://advertising.amazon.com/resources/ad-specs/sponsored-brands-video, Accessed from Internet on May 21, 2024, pp. 2-5.
Amazon.com, "Sponsored Display," Available online at: https://advertising.amazon.com/solutions/products/sponsored-display?ref_=a20m_us_hnav_smb_p_sd_t1, Accessed from Internet on May 21, 2024, pp. 1-15.
Amazon.com, "Sponsored TV," Available online at: https://advertising.amazon.com/products/sponsored-tv?ref_=a20m_us_hnav_smb_p_spot_t1, Accessed from Internet on May 21, 2024, pp. 1-13.
Lean , "Check Out this Feature in @LTXStudio", Available online at: https://x.com/chaseleantj/status/1791785543266947255, May 18, 2024, 16 pages.

* cited by examiner

*Primary Examiner* — Shivang I Patel
(74) *Attorney, Agent, or Firm* — Kilpatrick Townsend & Stockton LLP

(57) ABSTRACT

Embodiments described herein can involve generating videos depicting items with animated backgrounds using machine learning. In an example, a computer system can generate a first input based at least in part on an image of an item. The computer system can cause one or more processors to use a first machine learning model to generate an animation depicting the item based at least in part on the first input. The computer system can generate a second input based at least in part on the animation and the image of the item. The computer system can cause the one or more processors to use a second machine learning model to generate a video depicting the item with an animated background based at least in part on the second input.

20 Claims, 11 Drawing Sheets

GENERATING VIDEOS OF ITEMS WITH ANIMATED BACKGROUNDS USING MACHINE LEARNING

BACKGROUND

Generative artificial intelligence models may be used to inpaint items into images or videos, or to outpaint backgrounds for images or videos of an item. But generating animated videos that maintain the integrity of the item may be a challenging task. For instance, when animating backgrounds, such animations may also depict distortions (e.g., in shape, size, or color) of the item. The item in such videos may be altered or even completely modified.

BRIEF DESCRIPTION OF THE DRAWINGS

Various embodiments in accordance with the present disclosure will be described in reference to the drawings, in which.

DETAILED DESCRIPTION

Figure 1:
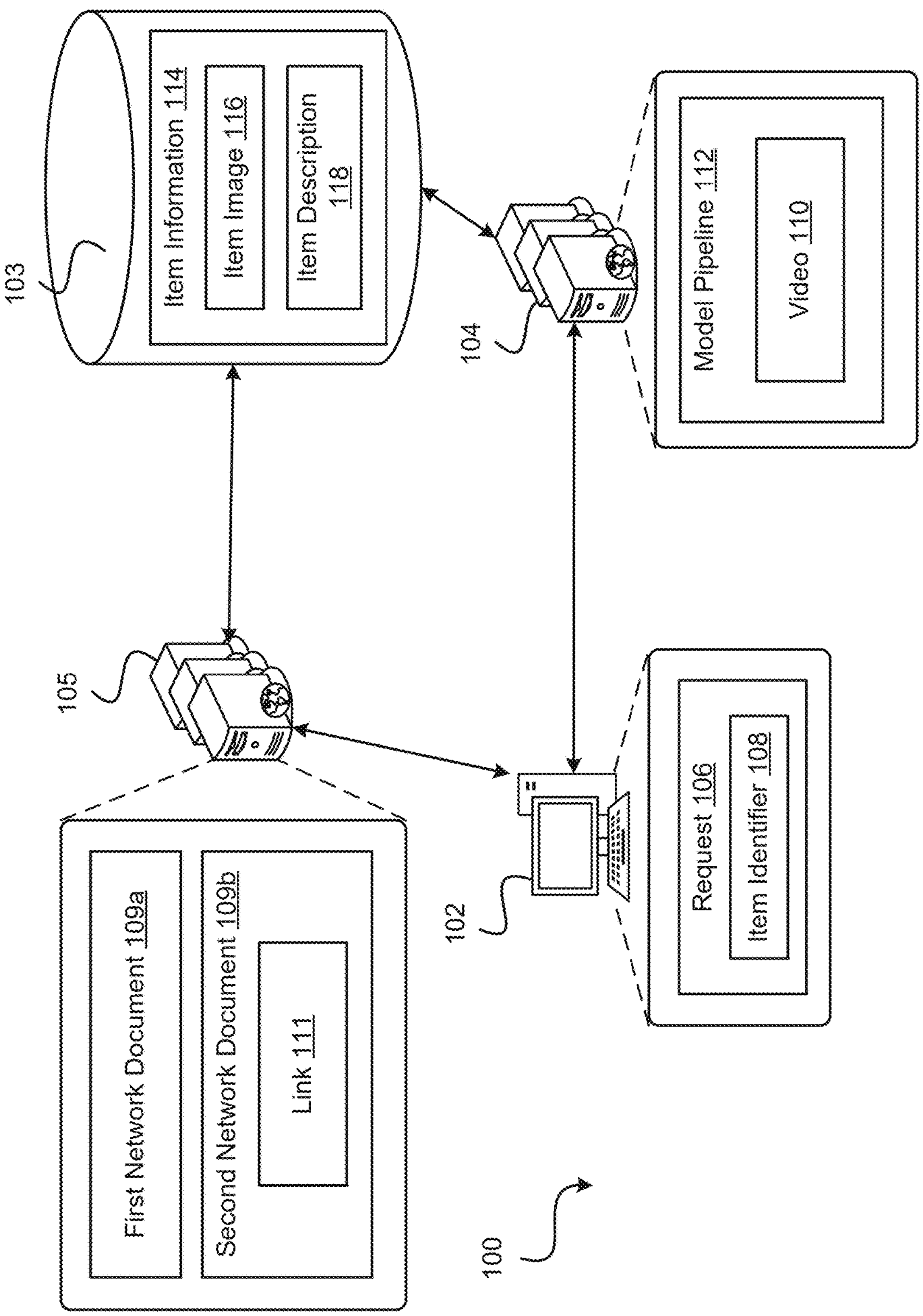
FIG. 1 illustrates an example block diagram of a computing environment for generating a video of an item with an animated background, according to some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Embodiments of the present disclosure are directed to, among other things, a multi-stage automated machine learning system that can generate a video depicting an item with an animated background. For example, the machine learning system can include a model that can apply a parallax effect to an image of an item to produce an animation. The animation may involve the image having a camera path (e.g., panning up, down, left, or right; zooming in or out, etc.) applied to the image. The image of the item may, in some examples, have a generated background that is outpainted (e.g., by another machine learning model) from the item depicted in the image. The background may also include one or more animatable elements. The machine learning system can also include a generative diffusion model that can use the animation of the item to generate a video of the item. The background of the video, such as the animatable elements, may be animated.

To illustrate, consider an example of a multi-stage machine learning system trained to generate videos of items with animated backgrounds. A client may request that an animated video of a product be generated. The request may include a product identifier, which can be a unique code associated with the product. The machine learning system may use the product identifier to access product information, which may include a product image, product descriptions, etc. The product information can be provided to a large language model to generate text prompts that are contextually relevant to the product. In some examples, the large language model can be trained to produce text prompts that include animatable elements, such as mist, beach waves, streams, fog, clouds, etc. The machine learning system can further include a background removal model that can automatically remove the background from the product image. For example, the isolated (e.g., background-removed) product can be automatically scaled and placed on a canvas (e.g., using a template, such as the rule of thirds) to generate a product mask.

Next, the machine learning system can execute an image diffusion model to outpaint areas that are context relevant out from the product to ensure visual consistency with the product on the canvas. In particular, the generated text prompts and the product mask can be provided as input to the image diffusion model. The image diffusion model can generate an outpainted image featuring the product and an outpainted background. For a given outpainted image, the machine learning system can select a camera path (e.g., pan left or right, zoom in or out, etc.) and can render key frames using a parallax effect. The parallax effect can adopt monocular depth estimation to represent each pixel in the outpainted image in three-dimensional space. Then, the machine learning system can render the key frames based on the selected camera path. The rendered key frames can then go through a hole-filling step (e.g., through a conventional neural network (CNN)), which may lead to blurry frames. To overcome this limitation, in some examples, product-only frames can be rendered as well (e.g., from the product mask). Pixels from the product-only frames can be pasted back into the rendered key frames after hole filling. In this way, an animation that depicts outpainted key frames with a pixel-faithful product can be generated.

The machine learning system can then generate a video that can maintain faithfulness of the product while including lively movements in the background. To do so, the machine learning system can include an image-to-video generator that can generate the video from the animation. For the image-to-video generator, an initial latent embedding can be set as a weighted sum of random noises and encoded features of the animation. The weight between noises and features can adjust the amount of motions and dependency to conditioning frames in the animation. Additionally, noises on the product mask can be suppressed, and embeddings on the product mask can be replaced with a conditioning latent after every iteration of a diffusion process used by the image-to-video generator. Further, pixels from the product-only frames for the product mask can be pasted into the video after animating the background to have pixel-perfect frames. Once animated key frames are generated, in some examples, video frame interpolation can additionally be applied to enhance temporal smoothness. The output of the machine learning system can therefore be a video that faithfully features the product and has a contextually relevant background with depth, camera motion, and background animation effects. In some examples, the video can be automatically incorporated into a network document (e.g., an advertisement of a webpage).

Embodiments of the present disclosure provide several technological advantages over existing systems. In many cases, a conventional generative model may produce videos of items that depict hallucinations or modifications to the item when animating the background of the videos. It may be difficult or impossible to maintain visual integrity of the item using conventional generative techniques. Embodiments of the present disclosure can generate videos with animated backgrounds and pixel-perfect depictions of items by additionally rendering item-only frames. Pixels from the item-only frames can be pasted back into the animated video frames, allowing only the background to be animated and keeping the depiction of the item consistent throughout the video. Embodiments described herein can thus improve accuracy and image quality for video generation and can prevent hallucinations of the item. Embodiments described herein may also quickly (e.g., within two or three minutes) generate a video depicting an item with an animated background using an automated pipeline with relatively low friction compared to conventional techniques. For example, the automated pipeline may automatically generate the video based solely on accessible item information, such as an item description and an item image.

Embodiments of the present disclosure can further provide increased user engagement and content accessibility compared to conventional techniques. For example, embodiments described herein can enable video creation by entities with limited resources or expertise in video editing and can improve navigation efficiency of content. Additionally, embodiments of the present disclosure can generate videos of items with animated backgrounds with reduced consumption of computing resources compared to conventional techniques. This can enable creation of videos at scale without compromising quality or speed of generating videos. Further, embodiments of the present disclosure can ensure consistency in video output, which can help maintain a uniform style and quality across all generated videos. The videos generated herein may be seamlessly integrated into existing systems, such as network pages (e.g., application pages or webpages).

FIG. 1 illustrates an example block diagram of a computing environment 100 for generating a video 110 of an item with an animated background, according to some embodiments. The computing environment 100 can include a user device 102, a computing device 104, a data store 103, and a content server 105. The user device 102, data store 103, the computing device 104, and content server 105 can include any appropriate device operable to send and receive requests, messages, information, etc. and can communicate over an appropriate network. Examples of the user device 102, the content server 105, and/or the computing device 104 can include personal computers, cell phones, handheld messaging devices, laptop computers, set-top boxes, personal data assistants, electronic book readers, and the like.

The computing device 104 can include a model pipeline 112 that can generate videos 110 depicting items against contextual animated backgrounds. For example, the user device 102 may transmit a request 106 for a video depicting a particular item, identified with an item identifier 108, to the computing device 104. The data store 103 may store item information 114 for various items, each with their own unique item identifier. The computing device 104 may access item information 114 for the item requested by the user device 102 using the item identifier 108. The item information 114 may include an image of the item (e.g., item image 116), an item description 118, and any other information associated with the item, such as the item title, item features, etc. In some examples, the item information 114 may be available to be presented in a first network document 109*a* (e.g., from the content server 105) associated with the item, such as a web page or an application page at which the item can be purchased.

In an example, the item information 114 can include information on a product detail page for a product. For example, the item information 114 may include a title of the product (e.g., the brand and product name), which may be a critical element for search visibility and customer recognition. The item information 114 may include visual representations of the product from different angles, which may be essential for giving a user a clear idea of what the product may look like. The item information 114 may include a list of key product features or benefits (e.g., in bullet form). The item information 114 may include a relatively detailed narrative about the product, its uses, and any additional information that might be relevant to a user. The item information 114 may include options such as size, flavor, pack size, color, etc. that may be available for the product. The item information 114 may include user reviews and other feedback from users who have purchased the product, which can help in informing purchasing decisions. The item information 114 may include user questions and answers, which can be a section where potential buyers can ask questions about the product and receive answers from other users or the seller. The item information 114 may include a unique identifier for the product within a product catalog stored in a database, such as an ASIN (Amazon Standard Identification Number. The unique identifier may be included in a uniform resource locator (URL) for the product detail page.

The computing device 104 can provide the item information 114 to the model pipeline 112 to generate the video 110 depicting the requested item with a contextual and animated background. The model pipeline 112 may include two or more machine learning models, such as a first machine learning model that can generate an animation of the item and a second machine learning model that can generate the video 110 based on the animation. The background of the video 110 may depict animated elements, such as waves, clouds, steam, confetti, etc., while maintaining the visual integrity of the item in the video 110. In some examples, the computing device 104 may store the video 110 in the data store 103. The video 110 may be stored with the item identifier 108 for the item. In some examples, the computing device 104 may transmit the video 110 to the user device 102.

Additionally or alternatively, the computing device 104 may incorporate the video 110 into a second network document 109*b* (e.g., a web page or an application page). For example, the video 110 may be incorporated as an advertisement into a product page for another product, or as a video advertisement for another video. The video 110 can be incorporated into the second network document 109*b* by including a link 111 to the video 110. For example, the link

111 can be to a network address for the storage location of the video 110 within the data store 103. The user device 102 can use the link 111 to access the video 110 and incorporate the video 110 within the presentation of the second network document 109*b*.

The computing environment 100 in one embodiment is a distributed computing environment utilizing several computer systems and components that are interconnected via communication links, using one or more computer networks or direct connections. However, it will be appreciated by those of ordinary skill in the art that such a system could operate equally well in a system having a fewer or greater number of components than are illustrated in FIG. 1. Thus, the depiction of the computing environment 100 in FIG. 1 should be taken as being illustrative in nature, and not limiting to the scope of the disclosure.

Figure 2:
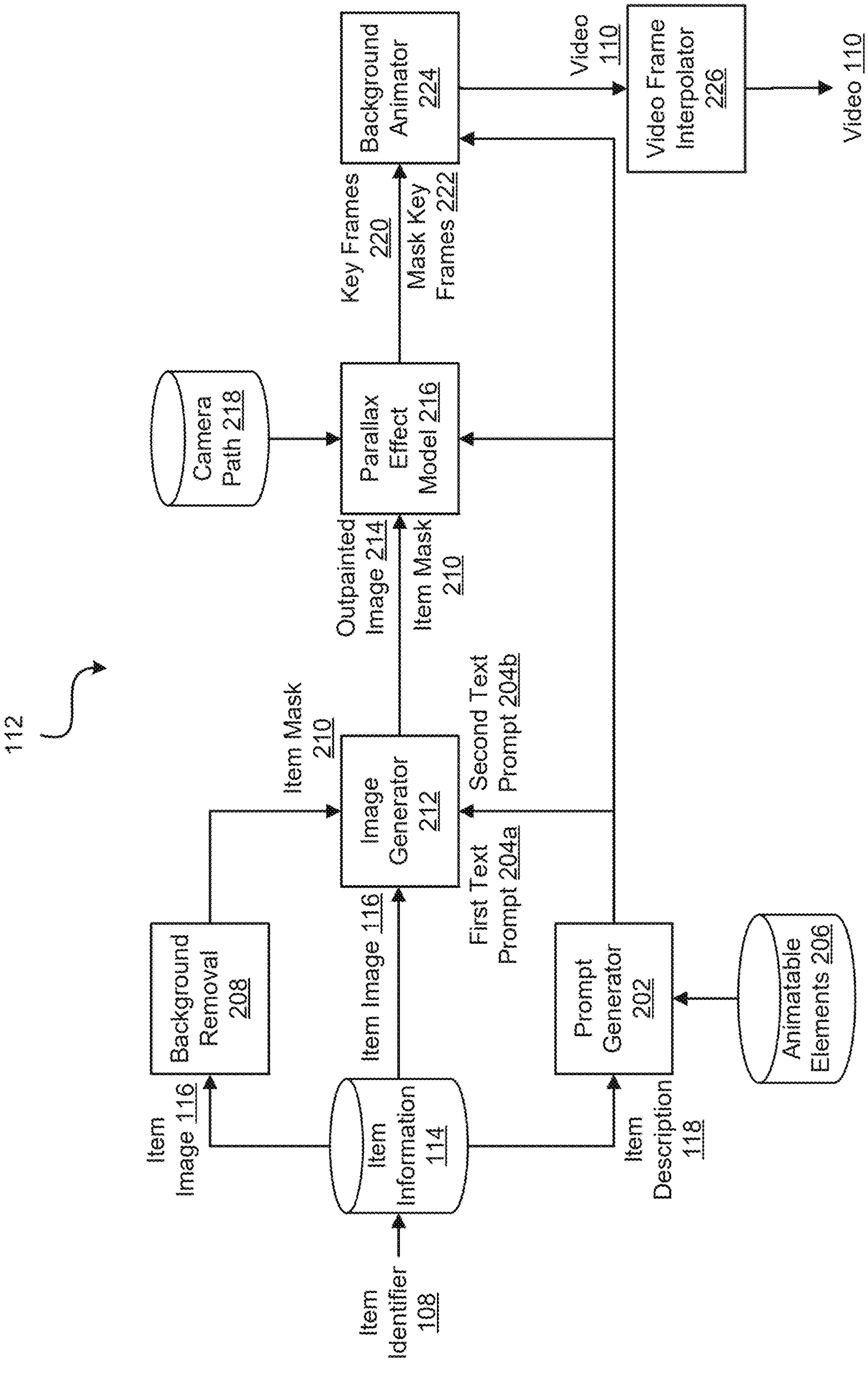
FIG. 2 illustrates an example block diagram of a model pipeline for generating a video of an item with an animated background, according to some embodiments.

FIG. 2 illustrates an example block diagram of a model pipeline 112 for generating a video 110 of an item with an animated background, according to some embodiments. The model pipeline 112 may generate a video 110 that can depict an item without any modifications or hallucinations, and while visualizing some animations in the background. Typically, for text-to-video models, it may be difficult to keep the faithfulness in depicting an image of the item in a generated video. Thus, the model pipeline 112 can generate conditional frames featuring the item with an applied parallax effect and can animate only the non-item areas of the conditional frames.

The model pipeline 112 can begin with using an item identifier 108 to extract item information 114, such as an item title, feature bullets, item description 118, item image 116, and the like. The item information 114, such as the item description 118, can be provided as input to a prompt generator 202. The prompt generator 202 can be a machine learning model, such as a large language model. In an example, the prompt generator 202 may be a Claude model. The prompt generator 202 may in some examples be trained in a supervised learning process or an unsupervised learning process. The prompt generator 202 can be trained to generate text prompts based on the item information 114 that describe an expected outcome, such as describing a contextual image featuring the item. For example, the text prompts may be stable video diffusion prompts. In some examples, the prompt generator 202 may generate a single text prompt (e.g., first text prompt 204*a*). The first text prompt 204*a* may be a "positive" text prompt that describe high quality, desirable video prompts. An example of a positive text prompt for an item that is a beach tote bag can be "A sandy beach at sunset, with gentle waves lapping the shore. Palm trees sway in the warm breeze, casting long shadows across the sand. Seashells and driftwood are scattered along the shoreline, and a few seagulls soar overhead." In some examples, the prompt generator 202 may also generate a negative text prompt (e.g., second text prompt 204*b*) that can indicate features to avoid in a video. An example of a negative prompt for the beach tote bag can be "watermark, text, cartoon, painting, illustration, worst quality, low quality, normal quality, face, human, hands, eyes, borders, high contrast, low resolution, distorted, logos, frames, ugly, deformed, messy, pixelated, noisy."

The prompt generator 202 may also be trained to incorporate animatable elements 206 into the first text prompt 204*a*. The prompt generator 202 may access a database of animatable elements 206 and may select one or more of the animatable elements 206. For example, the prompt generator 202 may identify information associated with the item identifier 108, such as a product category for the item, and can match the product category with one or more animatable elements 206. In another example, the prompt generator 202 can classify the item into one or more categories associated with the one or more animatable elements 206 based on the item information 108. The classification may be a multimodal determination (e.g., based on image and text). For example, if the item is associated with the outdoors, the animatable element 206 may be a stream, fog, a cloud, a waterfall, an ocean, a beach, a fire, etc. If the item is associated with the indoors, the animatable element 206 may be steam, lens flare, confetti, etc. The prompt generator 202 may select the animatable elements 206 based on the item information 114 and can incorporate description of the animatable element 206 into the first text prompt 204*a*.

In parallel to the prompt generator 202, the model pipeline 112 can also involve performing a background removal 208 on the item image 116. The background removal 208 can be performed by a machine learning model, such as an image segmentation model. In some examples, the background removal 208 can be performed by a contrastive language-image pre-training (CLIP) model. The background removal 208 can generate an item mask 210. For example, the background-removed item can be automatically scaled and positioned on a canvas (e.g., according to a template, such as the rule of thirds) to generate the item mask 210. The item mask 210, item image 116, and text prompts 204*a-b* can be provided as input to an image generator 212 that can generate an outpainted image 214 by outpainting outside the areas of the item on the item mask 210 according to the first text prompt 204*a*. In some examples, the image generator 212 can be the Titan Image Generator, such as a fine-tuned version of the Titan Image Generator. In another example, the image generator 212 can be an outpainting model (e.g., Oculus XL) that can be fine-tuned using a stable diffusion XL (SDXL) model. If the second text prompt 204*b* (e.g., the negative prompt) is also provided as input, the image generator 212 can generate an outpainted image 214 that does not depict the features described in the second text prompt 204*b*. The outpainted image 214 may be an image that depicts the product in context (e.g., according to the first text prompt 204*a*). Providing the second text prompt 204*b* in addition to the first text prompt 204*a* can improve the image quality and features depicted in the outpainted image 214 compared to providing only the first text prompt 204*a* as input.

Figure 3:
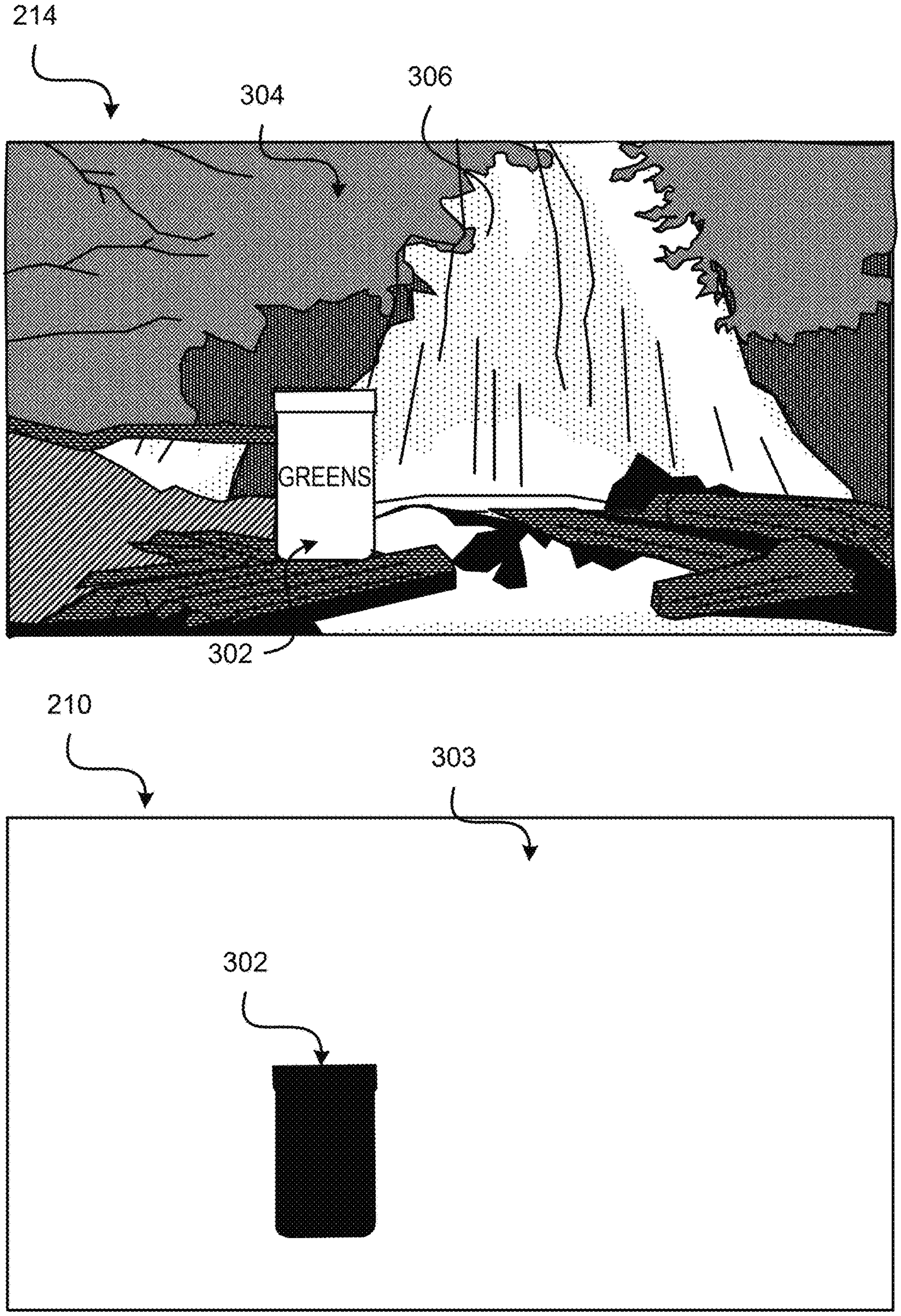
FIG. 3 illustrates an example of an outpainted image and an item mask, according to some embodiments.

An example of the outpainted image 214 and the item mask 210 are depicted in FIG. 3, according to some embodiments. The item mask 210 may depict an item 302, which in this example is a container of powdered greens, on a blank canvas 303. The outpainted image 214 may depict the item 302 with a generated background 304 that is contextually related to the item 302, such as an outdoor nature setting. The background 304 may be outpainted in areas outside of the item 302 (e.g., in the blank regions of the item mask 210). The background 304 may depict an animatable element 306, such as a waterfall and a stream. The background 304 and the animatable element 306 can be generated according to a text prompt, such as "a product sitting on a tree log. A beautiful rapid water fall and water stream in the background. Tall dark green trees. Ultra high quality. 4K. 8K. Highly detailed."

Returning to the description of FIG. 2, the outpainted image 214 that was generated by the image generator 212, as well as the item mask 210, can be provided as input to a parallax effect model 216. The parallax effect model 216 can be one or more machine learning models that can apply a parallax effect to the outpainted image 214 and the item mask 210. The parallax effect model 216 can adopt monocular depth estimation (e.g., by using a DepthAnything model) to represent each pixel in the outpainted image 214 and the item mask 210 in three-dimensional space and segment image areas into multiple depth layers. The parallax effect model 216 can apply inpainting (e.g., by using a LaMa model) to occluded layers. Then, the parallax effect model 216 can render key frames 220 of the outpainted image 214 based on a selected camera path 218 by lifting pixels at different layers to 3D space (e.g., by using a PyTorch3D model). The parallax effect model 216 can further render mask key frames 222 of the item mask 210 based on the selected camera path 218.

The parallax effect model 216 can select a camera path 218 from a database of predefined camera paths. In some examples, the camera path 218 may be selected based on a predicted engagement preference of viewers, based on a product category for the item, preselected by the user, etc. Examples of camera paths 218 can include a zoom in or out, a horizontal or vertical pan, a horizontal arc-shot, tilt-down, tilt-down-zoom-in, rotating-zoom-in, dolly-zoom-in, or any suitable camera path. The resulting key frames 220 can be an animation showing the outpainted image 214 with an applied parallax effect, showing motion along the selected camera path. Similarly, the resulting mask key frames 222 can be an animation showing the isolated image of the item with the same motion along the same selected camera path. The parallax effect model 216 is further described below with respect to FIG. 4.

The key frames 220 and the mask key frames 222 can be provided as input to a background animator 224, which can be a machine learning model such as a generative diffusion model. The background animator 224 can be trained to generate a video 110 that animates the background of the key frames 220 and without animating the mask key frames 222. For example, the background animator 224 can animate the animatable elements 206 depicted in the key frames 220. In some examples, the background animator 224 can generate the video 110 by pasting in pixels from the mask key frames 222 to obtain a video 110 with a pixel-perfect depiction of the item. The background animator 224 is further described below with respect to FIG. 6.

In some examples, post-processing may be applied to the video 110 to improve frames-per-second. For example, the video 110 can be provided to a video frame interpolator 226 that can perform video frame interpolation, such as a rate of 8×, to enhance temporal smoothness. In a non-limiting example, the video frame interpolator 226 can render a 4-second-long video at 30 fps from 16 generated frames. In some examples, the model pipeline 112 can synthesize, from image to video, a 1512×840 video in 2.5 to 3 minutes from end to end. The resulting video 110 can depict an item with applied parallax effect and an animated background.

Figure 4:
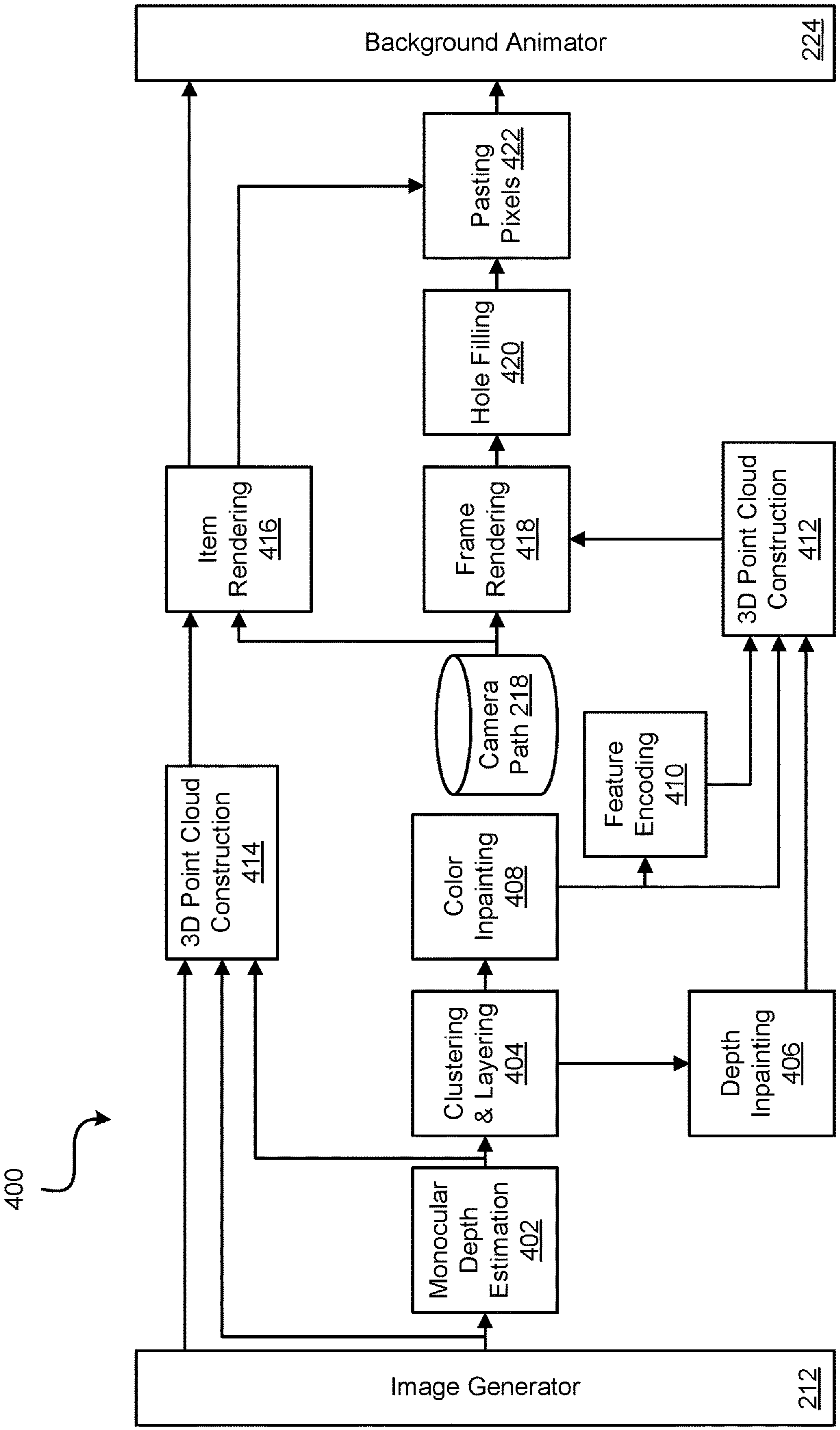
FIG. 4 illustrates an example block diagram of a parallax effect pipeline for generating an animation of an item, according to some embodiments.

FIG. 4 illustrates an example block diagram of a parallax effect pipeline 400 for generating an animation of an item, according to some embodiments. The features of FIG. 4 may be described in reference to components of FIG. 2. The parallax effect pipeline 400 (e.g., executing the parallax effect model 216) can initially involve adopting monocular depth estimation 402 to represent each pixel of the outpainted image 214 on three-dimensional (3D) space. Performing monocular depth estimation 402 can thus produce a depth map that estimates depth of the outpainted image 214. A clustering and layering module 404 can then segment image areas of the outpainted image 214 to generate depth layers and red-green-blue (RGB) layers from the depth map. Inpainting can then be applied to the depth layers and RGB layers. For example, depth inpainting 406 can be applied on occluded areas of the depth layers to generate inpainted depth layers. Color inpainting 408 can be applied on occluded areas of the RGB layers to generate inpainted RGB layers. Inpainting the occluded layers can prevent having holes for a camera pose that may differ from the initial pose. Feature encoding 410 can be applied to the inpainted RGB layers to produce deep features. Then, pixels at different layers (e.g., inpainted depth layers, inpainted RGB layers, deep features) can be lifted to 3D space as a 3D point cloud construction 412. The 3D point cloud construction 412 can have frame rendering 418 applied according to a selected camera path 218 to generate key frames 220. The output may, in an example, be a set of 16 frames at every 0.25 seconds (e.g., for a 4 second video). The number of frames, the length of the video, and/or the camera path 218 may, in some examples, be requested by the user device 102 of FIG. 1.

In some examples, the key frames 220 generated by applying the parallax effect to the outpainted image 214 may have holes. Thus, hole filling 420 may be applied to the key frames 220 (e.g., using a conventional neural network). The hole filling 420 may lead to blurry frames. Thus, item-only frames may also be rendered. For example, in parallel, the parallax effect pipeline 400 may involve adopting monocular depth estimation 402 to represent each pixel of the item mask 210 on 3D space. The pixels of the item mask 210 can also be lifted to 3D space as a 3D point cloud construction 414. The 3D point cloud construction 414 of the item mask 210 can then have item rendering 416 applied according to the selected camera path 218 (e.g., the same camera path that was applied to the frame rendering 418 of the outpainted image 214) to produce mask key frames 222. Finally, the parallax effect pipeline 400 may involve pasting pixels 422 from the mask key frames 222 to the key frames 220 to obtain a pixel-perfect animation of the item. Pasting the pixels from the mask key frames 222 can prevent hallucinations of the item and preserve fidelity of depiction of the item in the key frames 220. The pasted key frames 220 (e.g., the animation) and the mask key frames 222 can be provided to the background animator 224 to animate the background of the key frames 220.

Figure 5:
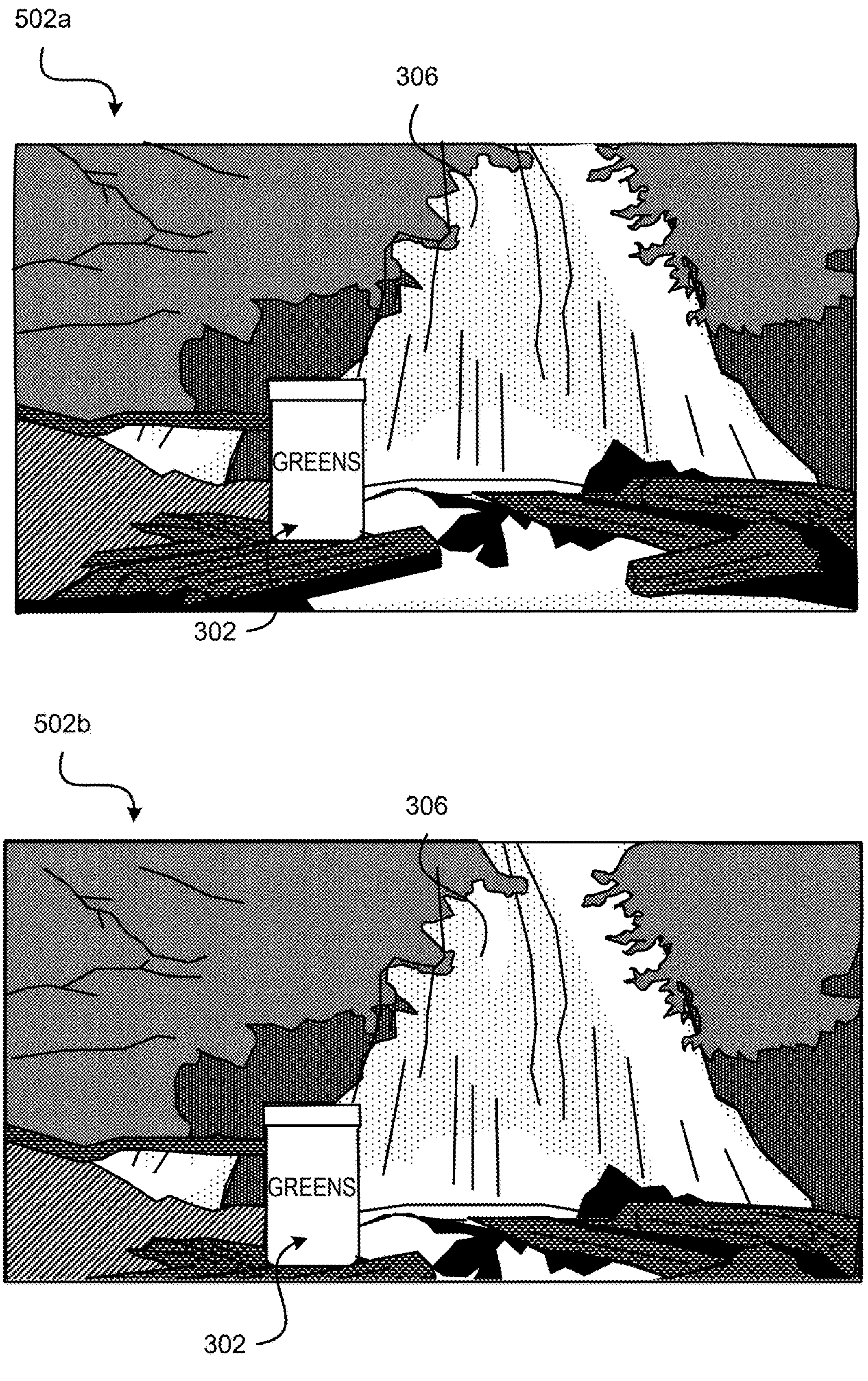
FIG. 5 illustrates an example of an animation of key frames with applied parallax effect, according to some embodiments.

FIG. 5 illustrates an example of an animation of key frames (e.g., the key frames 220 of FIGS. 2 and 4) with applied parallax effect, according to some embodiments. A first key frame 502*a* may depict the item 302 with the generated background showing an animatable element 306 (e.g., a waterfall). The item 302 and the animatable element 306 may be in a first position in the first key frame 502*a*. Subsequent key frames can have the parallax effect applied, which in this example may be a pan-up camera effect. For example, second key frame 502*b* may depict the item 302 and the animatable element 306 at a higher angle.

Unlike in two-dimensional (2D) animation, applying the parallax effect to the key frames 502*a-b* may consider the 3D position of the item in the outpainted image 214. For example, according to the 3D point cloud construction 412, the item 302 in the first key frame 502*a* may be positioned in the foreground. When the parallax effect is applied, the foreground (including the depiction of the item) of the second key frame 502*b* may move relatively fast, while the background (e.g., the animatable element 306) may move relatively slowly.

Figure 6:
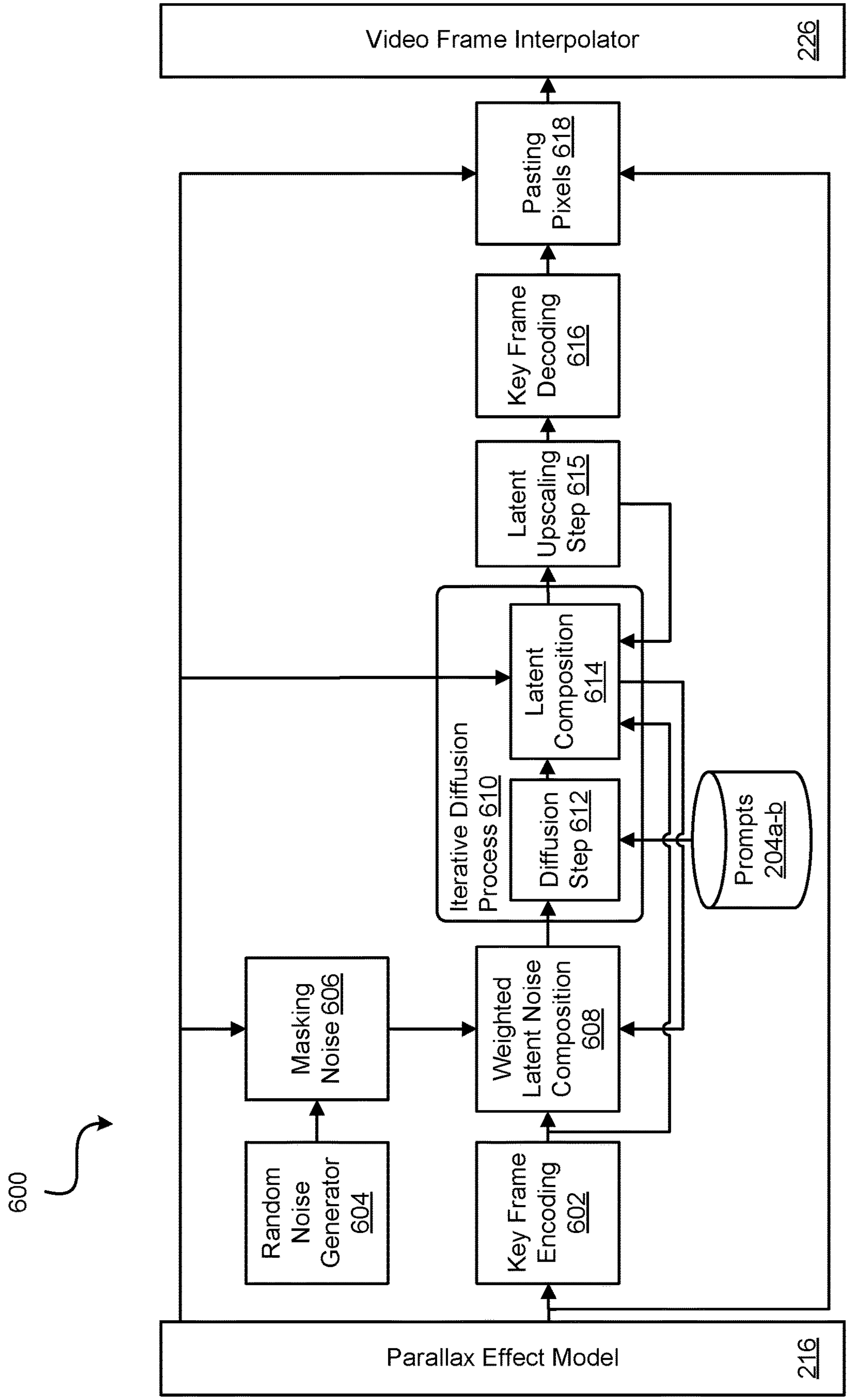
FIG. 6 illustrates an example block diagram of an animation pipeline, according to some embodiments.

FIG. 6 illustrates an example block diagram of an animation pipeline 600 (e.g., the background animator 224 of FIG. 2), according to some embodiments. Elements of FIG. 6 are described with reference to components of FIGS. 2 and 4. The animation pipeline 600 can add motion to the animatable elements 206 while maintaining the shape and position of the item depicted in the key frames 220. The animation pipeline 600 may begin with receiving the key frames 220 (e.g., a parallax effect animation of the out-painted image 214 depicting the item) and the mask key frames 222 (e.g., a parallax effect animation of the item mask 210) that were generated by the parallax effect model 216.

The animation pipeline 600 may involve performing key frame encoding 602 to encode features of the key frames 220. The key frame encoding 602 can be used to set an initial latent embedding. In parallel, a random noise generator 604 can be used to generate noise. The noise can be used to generate masking noise 606, which can be a weighted sum of random noises. Then, the masking noise 606 can be added to the latent embedding to generate a weighted latent noise composition 608. The weight between noises and features can adjust the amount of motions and dependency to the key frames 220. Thus, the original context and details can be preserved in the key frames 220, but animations can be added in using the masking noise 606. The resulting masked latent embedding with noise can be used by an iterative diffusion process 610 that can add animations to the masked latent embedding with noise.

The iterative diffusion process 610 can additionally receive an input of text prompts 204*a-b*. The iterative diffusion process 610 can include a diffusion step 612 and a latent composition step 614. The diffusion step 612 can generate animations in the masked latent embedding with noise based on the prompts 204*a-b* (e.g., a first text prompt 204*a* that includes an animatable element 206). After the diffusion step 612, the masked latent embedding can be denoised before the latent composition step 614.

The latent composition step 614 may also receive the mask key frames 222 as input. The masking noise 606 on the mask key frames 222 can be suppressed. The latent composition step 614 may involve combining the mask key frames 222 in latent embedding space with the denoised latent embeddings. The embeddings of the item on the latent embeddings can be replaced with the mask key frames 222 after every iteration of the iterative diffusion process 610. This can preserve the visual integrity of the item so that the animatable elements in the background can be animated without modifying the item in the iterative diffusion process 610. After the latent composition step 614, the resulting latent embeddings may in some examples have relatively low resolution. Thus, the iterative diffusion process 610 can further include a latent upscaling step 615. The latent upscaling step 615 can involve applying nearest-neighbor upscaling to the latent embeddings to increase the resolution of the latent embeddings.

In some examples, the latent composition step 614 can be applied to the upscaled latent embeddings to replace the embeddings of the item on the upscaled latent embeddings with the mask key frames 222. This can produce item-restored upscaled latent embeddings. In some examples, another weighted latent noise composition 608 can be generated by adding masking noise 606 to the item-restored upscaled latent embeddings. The iterative diffusion process 610 can then be performed on the upscaled and masked latent embeddings.

The iterative diffusion process 610 may then iterate on the latent embeddings generated in previous rounds of the iterative diffusion process 610, such as up to 25 or 30 times. After completing these iterations, the iterative diffusion process 610 can output a latent embedding with an animated background. A key frame decoding 616 can be performed on the latent embedding with the animated background to generate animated frames. Then, a pasting pixels step 618 can be performed by pasting pixels from the mask key frames 222 into the animated frames to generate pixel-perfect animated frames. This can happen three times-twice in RGB ground, and once in the latent domain. The resulting output of the animation pipeline 600 can be a video 110 depicting the item with an animated background. The video 110 can be provided to the video frame interpolator 226.

Figure 7:
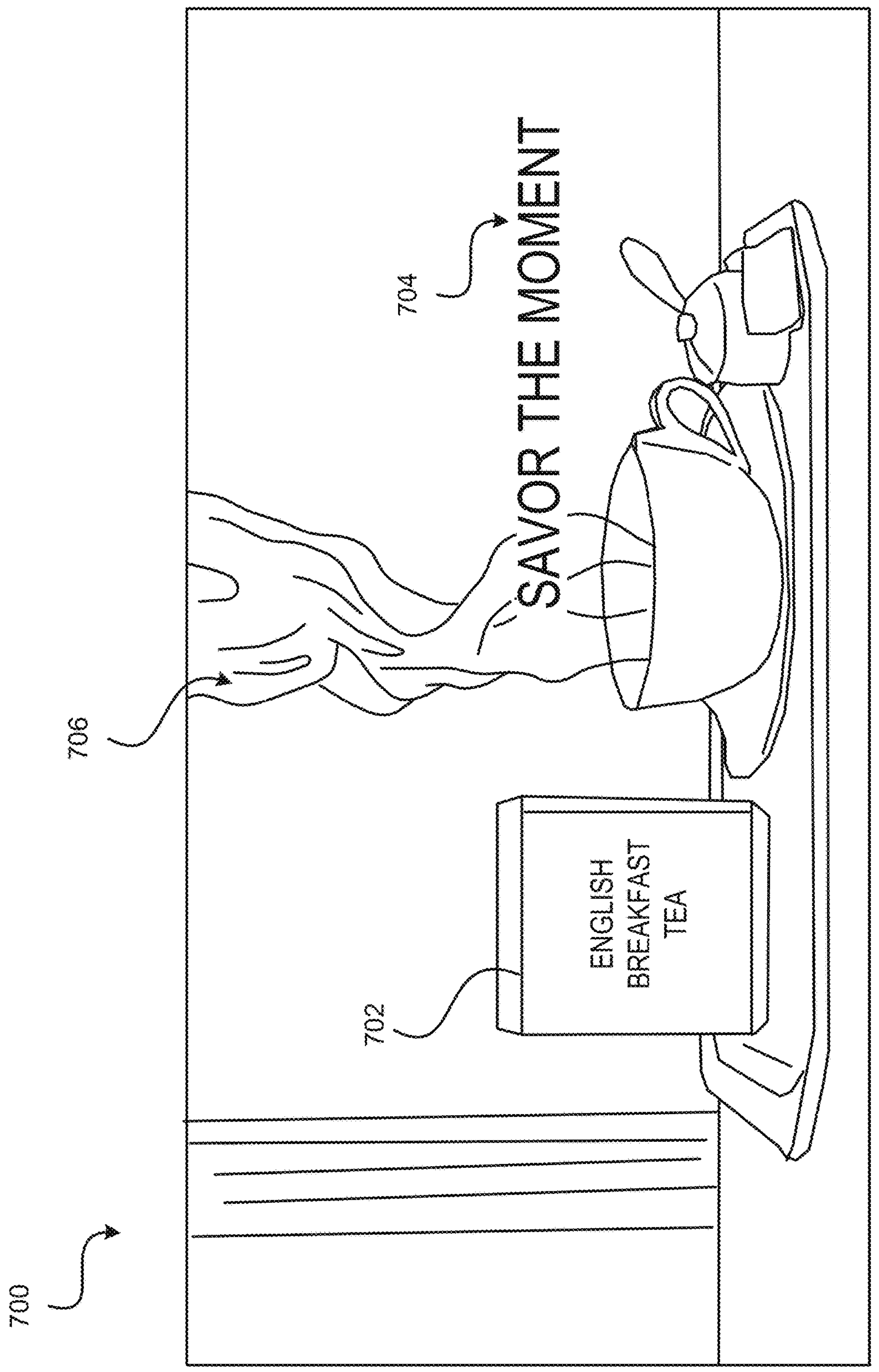
FIG. 7 illustrates an example of an animated headline in a video of an item, according to some embodiments.

In some examples, the video 110 generated by the animation pipeline 600 (e.g., the background animator 224) can include text (e.g., a headline), such as an animated headline. FIG. 7 illustrates an example of an animated headline 704 in a video frame 700 of an item 702 (e.g., a package of tea bags), according to some embodiments. The video frame 700 may include an animatable element 706 (e.g., steam) that can be animated in the video for the video frame 700. The headline "savor the moment" may, in some examples, be generated by the prompt generator 202 of FIG. 2. The prompt generator 202 may use the item information 114 (e.g., the item description 118, item title, feature bullets, item image 116, etc.) to generate the headline. The headline can be provided as input to the animation pipeline 600. In particular, the headline can be provided as input to the diffusion step 612 of the iterative diffusion process 610 of FIG. 6. In some examples, prior to being provided as input to the animation pipeline 600, the parallax effect model 216 of FIG. 2 can apply the parallax effect (e.g., using the same camera path 218 that was used for the key frames 220 and the mask key frames 222) to the headline.

The iterative diffusion process 610 can integrate the headline into a video when animating the background of the video frame 700. The resulting video frame 700 can depict the animated headline 704. The animated headline 704 may have an animation applied to the generated headline. For example, over successive video frames, the animated headline 704 may fade into and out of view. In other examples, the animated headline 704 may change position or orientation in successive video frames. For example, the animatable element 706 (e.g., the steam) may be animated in successive video frames to rise from the teacup. Additionally, the animated headline 704 may rise in an upward direction with the steam in successive video frames. Any suitable animation of the animated headline 704 may be generated by the iterative diffusion process 610.

Figure 8:
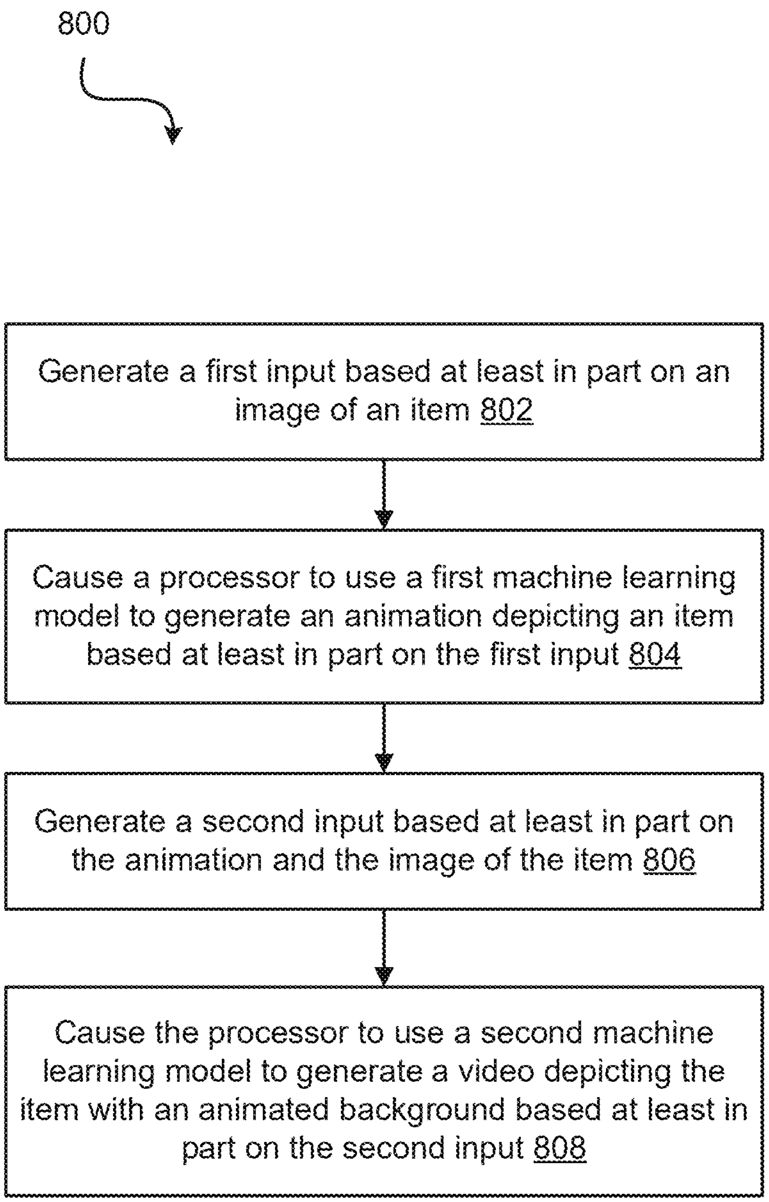
FIG. 8 illustrates an example flow of a process for generating a video of an item with an animated background, according to some embodiments.

FIG. 8 illustrates an example flow of a process 800 for generating a video of an item with an animated background, according to some embodiments. The process 800 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 800 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the user device 102, the computing device 104, the content server 105, the user device 1102, the web server 1106, and/or the application server 1108 may perform the process 800 of FIG. 8.

In an example, the process 800 may involve generating a first input based at least in part on an image of an item. For example, a third machine learning model (e.g., the prompt generator 202 of FIG. 2) can be used to generate a text prompt based at least on item information associated with the item. The item information may include an image item and an item description. In some examples, the text prompt may be a first text prompt describing first attributes to depict in an outpainted image. The third machine learning model may also generate a second text prompt describing second attributes to not depict in the outpainted image. In some examples, the third machine learning model may determine an animatable element associated with the item description. The third machine learning model can generate the first text prompt that describes the animatable element.

By at least using a fourth machine learning model (e.g., the image generator 212 of FIG. 2), an outpainted image can be generated based at least on the text prompt (or on the first text prompt and the second text prompt). For example, the item image can be placed onto an image template (e.g., the canvas 303 of FIG. 3). The fourth machine learning model can generate the outpainted image by outpainting a region of the image template outside of the item image on the image template. The outpainted image may depict the first attributes and may not depict the second attributes. For example, the outpainted image may depict the animatable element describes in the first text prompt. The outpainted image may be the image of the item (e.g., the first input).

In an example, the process 800 may include operation 804, which involves causing a processor to use a first machine learning model (e.g., the parallax effect model 216 of FIG. 2 or the parallax effect pipeline 400 of FIG. 4) to generate an animation depicting an item based at least in part on the first input. In some examples, the first machine learning model can generate the animation depicting the item by selecting a camera path for the animation. The first machine learning model can apply a parallax effect to the image of the item to generate a three-dimensional representation of a plurality of pixels depicted in the image of the item. The first machine learning model can then apply the camera path to the three-dimensional representation of the plurality of pixels depicted in the image of the item to generate the animation. In some examples, the process 800 may further involve generating an item mask by removing a background of the item image. In some examples, a camera path (e.g., the same camera path applied to the outpainted image) can be applied to the item mask by the first machine learning model to generate an item mask animation (e.g., the mask key frames 222 of FIG. 2).

In an example, the process 800 may include operation 806, which involves generating a second input based at least in part on the animation and the image of the item. In some examples, the second input may also include the text prompt(s) and the item mask animation.

In an example, the process 800 may include operation 808, which involves causing the processor to use a second machine learning model (e.g., the background animator 224 of FIG. 2) to generate a video depicting the item with an animated background based at least in part on the second input. The second machine learning model may generate a video of the item that animates the animatable element based at least in part on the text prompt and the outpainted image. In some examples, the second machine learning model can generate the video depicting the item with the animated background based at least in part on the item mask animation. For example, pixels from the item mask animation can be pasted into frames of the video to maintain visual integrity of the depiction of the item.

In some examples, video interpolation can be applied to the video. For example, the video can include multiple video frames. Generating the video can further involve selecting two adjacent video frames. One or more interpolated video frames can be generated based at least on the two adjacent video frames. The one or more interpolated video frames can be inserted between the two adjacent video frames to generate the video. In some examples, a link to the video can be included in a network document such that the video is presented in a presentation of the network document (e.g., on a display of a computing device).

Figure 9:
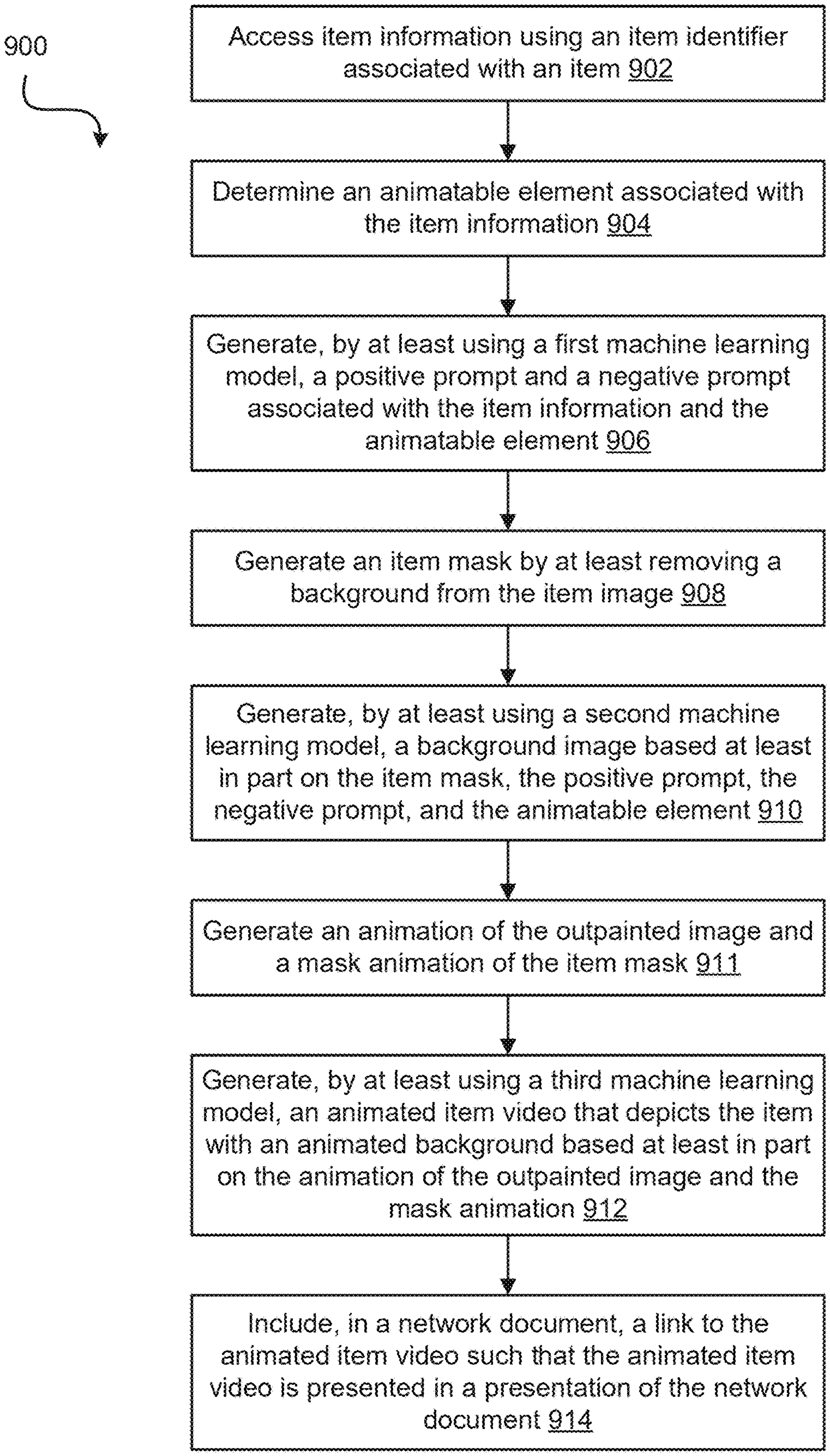
FIG. 9 illustrates an example flow of another process for generating a video of an item with an animated background, according to some embodiments.

FIG. 9 illustrates an example flow of another process 900 for generating a video of an item with an animated background, according to some embodiments. The process 900 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 900 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the user device 102, the computing device 104, the content server 105, the user device 1102, the web server 1106, and/or the application server 1108 may perform the process 900 of FIG. 9.

In an example, the process 900 may include operation 902, which involves accessing item information using an item identifier associated with an item. The item information can include an item image and an item description. The item information may be accessed in response to receiving a request for a video depicting the item with an animated background. The request may include the item identifier that uniquely identifies the item.

In an example, the process 900 may include operation 904, which involves determining an animatable element associated with the item information. In some examples, a first machine learning model (e.g., the prompt generator 202 of FIG. 2) may be trained to identify a particular animatable element from a predefined list of animatable elements that is most closely associated with the item information. The animatable element may be a feature that can be animated by another machine learning model to generate a video. For example, if the item is a tent, the first machine learning model may identify an animatable element from the predefined list such as a campfire or smoke.

In an example, the process 900 may include operation 906, which involves generating, by at least using the first machine learning model, a positive prompt (e.g., first text prompt 204*a* of FIG. 2) and a negative prompt (e.g., second text prompt 204*b* of FIG. 2) associated with the item information and the animatable element. The positive prompt may positively describe features that may be desirable to include in the video depicting the item. The negative prompt may describe unappealing or undesirable features that should not be included in the video depicting the item. The positive prompt may describe a background context for a video depicting the item. In an example where the item is crew socks, the positive prompt may be "zoom-in to reveal a grassy hillside trail. The crew socks are placed on the grass. A thick forest with tall trees and lush green underbrush. Sunrays stream between the trees. Farther out, there are meadows and more distant, taller mountain peaks barely visible through the mist." The positive prompt may describe animated elements, such as the sunrays and the grass or underbrush. The negative prompt may be "watermark, text, cartoon, painting, illustration, worst quality, low quality, normal quality, face, human, hands, eyes, borders, high contrast, low resolution, distorted, logos, frames, ugly, deformed, messy, pixelated, noisy."

In an example, the process 900 may include operation 908, which involves generating an item mask by at least removing a background from the item image. The background-removed image can then be placed on a canvas to generate the item mask. The item mask can be used to maintain visual integrity of the item in subsequent steps. For example, when images, frames, animations, or videos are generated, pixels from the item mask can be pasted in to maintain pixel-perfect integrity of the item.

In an example, the process 900 may include operation 910, which involves generating, by at least using a second machine learning model (e.g., the image generator 212 of FIG. 2), an outpainted image with an outpainted background based at least in part on the item mask, the positive prompt, the negative prompt, and the animatable element. The second machine learning model can be trained to generate outpainted images that depict features described in the positive prompt and do not depict features described in the negative prompt. The second machine learning model can also be trained to generate outpainted images that depict the animatable elements described in the positive prompt. The outpainted image can be generated by outpainting the background around the item image on the item mask.

In an example, the process 900 may include operation 911, which involves generating an animation of the outpainted image and a mask animation of the item mask. In some examples, a camera path can be applied to the outpainted image (e.g., to apply a parallax effect) by a fourth machine learning model (e.g., the parallax effect model 216 of FIG. 2 or the parallax effect pipeline 400 of FIG. 4). The same camera path can also be applied by the fourth machine learning model to the item mask. Applying the camera path to the outpainted image and the item mask can generate an animation of the outpainted image (e.g., the key frames 220 of FIG. 2) and a mask animation of the item mask (e.g., the mask key frames 222 of FIG. 2).

In an example, the process 900 may include operation 912, which involves generating, by at least using a third machine learning model (e.g., the background animator 224 of FIG. 2 or the animator pipeline 600 of FIG. 6), an animated item video that depicts the item with an animated background based at least in part on the outpainted image and the item mask. The third machine learning model can animate, in successive video frames, the animatable elements depicted in the outpainted background of the outpainted image. Pixels from the item mask can be applied to the video frames after each iteration of a generative diffusion process executed by the third machine learning model to preserve visual integrity of the item in the video frames.

In some examples, the animated item video can include multiple video frames. To create smoother motions and to increase the frames-per-second of the animated item video, a video interpolation process can be applied to the animated item video. For example, generating the animated item video may involve selecting two adjacent video frames. The second machine learning model may generate one or more interpolated video frames based at least on the two adjacent video frames. The interpolated video frames may depict intermediate motions between the two adjacent video frames. The one or more interpolated video frames can be inserted between the two adjacent video frames to generate an interpolated animated item video.

In some examples, the animated item video can include text (e.g., a headline). The text may be generated by at least using the first machine learning model and based at least in part on the item description. The animated item video can be generated (e.g., by the third machine learning model) to depict the text. In some examples, the text may be an animated text (e.g., an animated headline).

In an example, the process 900 may include operation 914, which involves including, in a network document, a link to the animated item video such that the animated item video is presented in a presentation of the network document. For example, the network document may be an advertisement on a product page (e.g., for another item). The link may be to a storage location for the animated item video.

Figure 10:
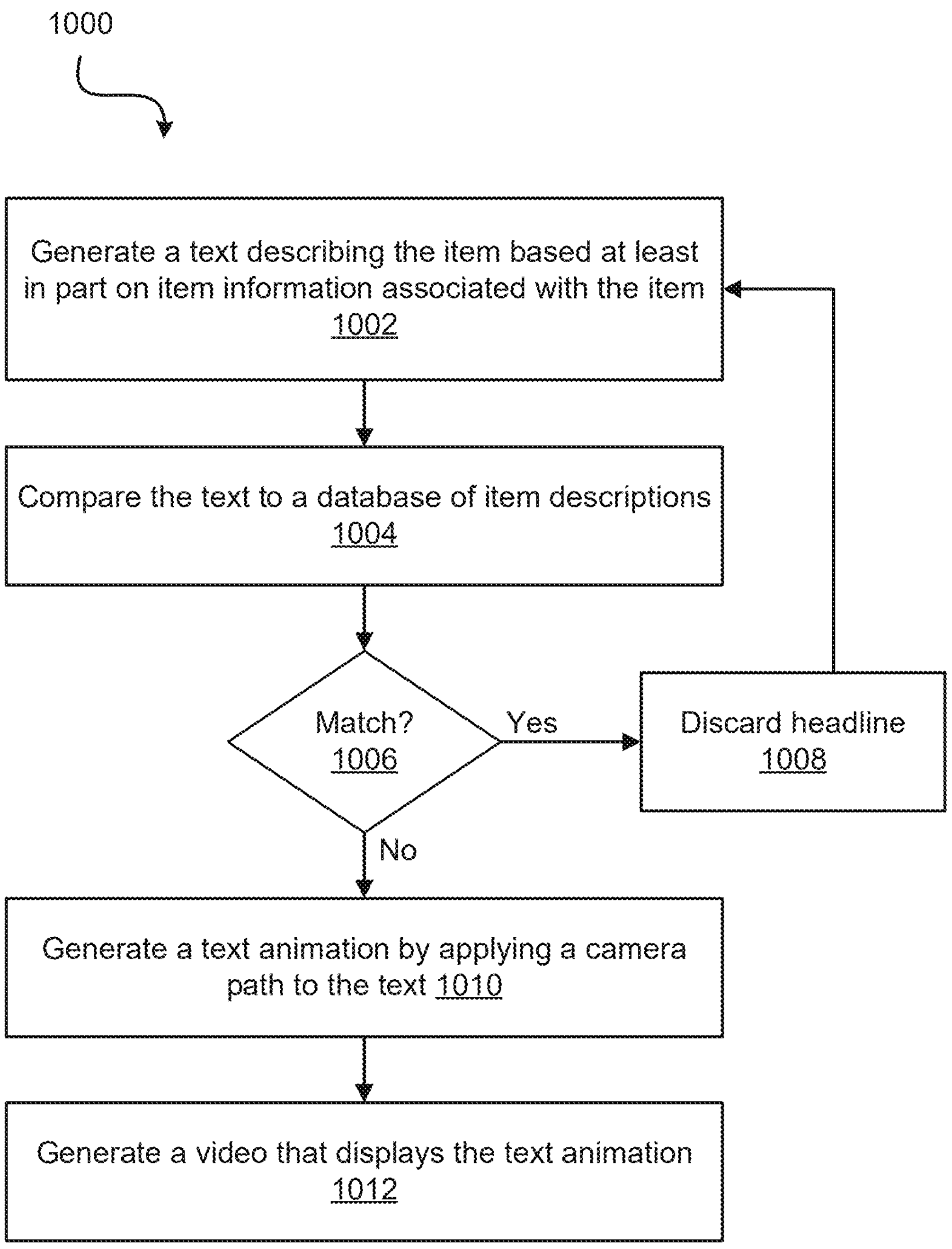
FIG. 10 illustrates an example flow of a process for generating an animated headline for a video of an item, according to some embodiments.

FIG. 10 illustrates an example flow of a process 1000 for generating an animated text (e.g., an animated headline) for a video of an item, according to some embodiments. The process 1000 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures, and the like that perform particular functions or implement particular data types. The order in which the operations are described is not intended to be construed as a limitation, and any number of the described operations can be combined in any order and/or in parallel to implement the process.

Additionally, some, any, or all of the process 1000 (or any other processes described herein, or variations and/or combinations thereof) may be performed under the control of one or more computer systems configured with executable instructions and may be implemented as code (e.g., executable instructions, one or more computer programs, or one or more applications) executing collectively on one or more processors, by hardware or combinations thereof. As noted above, the code may be stored on a computer-readable storage medium, for example, in the form of a computer program including a plurality of instructions executable by one or more processors. The computer-readable storage medium may be non-transitory.

In some examples, the user device 102, the computing device 104, the content server 105, the user device 1102, the web server 1106, and/or the application server 1108 may perform the process 1000 of FIG. 10.

In an example, the process 1000 can include operation 1002, which involves generating text (e.g., a headline) describing the item based at least in part on item information associated with the item. The text can, in some examples, be generated by a third machine learning model (e.g., the prompt generator 202 of FIG. 2). In an example, the item may be crew socks, and the item information may describe features of the crew socks, such as thick, comfortable soles and enhanced durability. The text generated from this item information may be "Breathe Easy in Plush Comfort."

In an example, the process 1000 can include operation 1004, which involves comparing the text to a database of item descriptions. The database of item descriptions may include logos, taglines, headlines, word marks, graphics, images (e.g., trade dress), sounds, smells, etc. for existing items. It may be beneficial to avoid using a text that matches an existing item description.

In an example, the process 1000 can include operation 1006, which involves determining whether a match between the text and the database of item descriptions is detected. If a match is detected between the text and an item description in the database, the process 1000 can continue to block 1008. If a match is not detected, the process 1000 can continue to block 1010.

In an example, the process 1000 can include operation 1008, which involves discarding the text in response to detecting the match (e.g., causing the third machine learning model to discard the text). The process 1000 can continue from operation 1008 to operation 1002 to generate an additional text describing the item based at least in part on the item information associated with the item (e.g., by the third machine learning model).

In an example, the process 1000 can include operation 1010, which involves generating a text animation by applying a camera path to the text (e.g., by a machine learning model, such as the parallax effect model 216 of FIG. 2 or the parallax effect pipeline 400 of FIG. 4). The camera path applied to the text may be the same camera path that is applied to an outpainted image or an item mask used to generate a video depicting the item. The text animation may include several image frames in which the text moves according to a camera path, such as a zoom in or a pan down.

In an example, the process 1000 can include operation 1012, which involves generating the video that displays the text by at least providing the text animation or the text as input to a second machine learning model (e.g., the background animator 224 of FIG. 2 or the animation pipeline 600 of FIG. 6). The second machine learning model can incorporate the text animation (or the text) into the video. For example, the text may be pasted over an animatable element in the video and may move with the animation of the animatable element.

Figure 11:
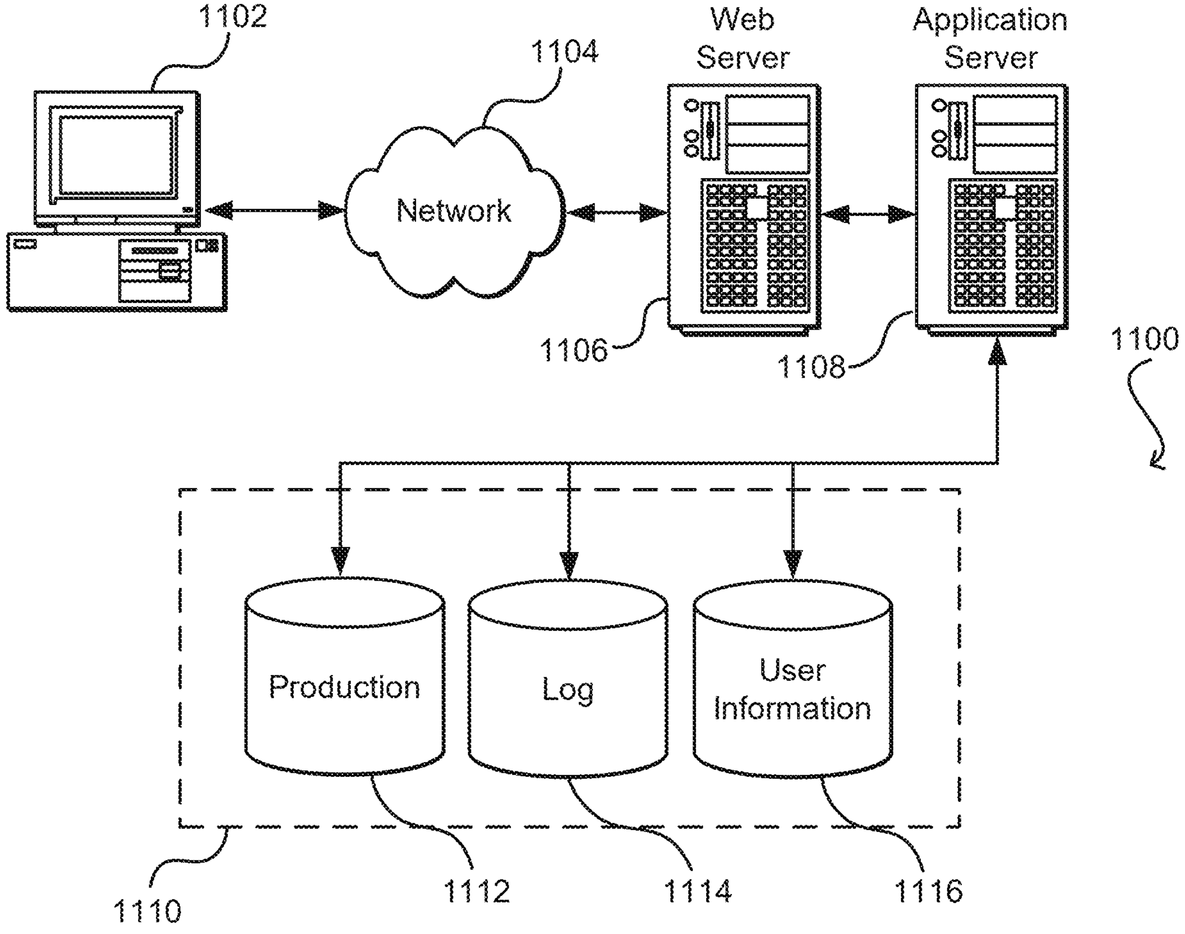
FIG. 11 illustrates an environment in which various embodiments can be implemented.

FIG. 11 illustrates aspects of an example environment 1100 for implementing aspects in accordance with various embodiments. As will be appreciated, although a Web-based environment is used for purposes of explanation, different environments may be used, as appropriate, to implement various embodiments. The environment includes an electronic user device 1102, which can include any appropriate device operable to send and receive requests, messages, or information over an appropriate network 1104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the user device 1102 and the application server 1108, can be handled by the Web server. It should be understood that the Web and application servers are not required and are merely example components, as structured code discussed herein can be executed on any appropriate device or host machine as discussed elsewhere herein.

The data store 1110 can include several separate data tables, databases or other data storage mechanisms and media for storing data relating to a particular aspect. For example, the data store illustrated includes mechanisms for storing production data 1112 and user information 1116, which can be used to serve content for the production side. The data store also is shown to include a mechanism for storing log data 1114, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1102. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the environment 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer system, comprising:

one or more processors; and one or more memories storing executable instructions that, upon execution by the one or more processors, cause the computer system to perform operations to:

access item information using an item identifier associated with an item, the item information comprising an item image and an item description;

determine an animatable element associated with the item information;

generate, by at least using a first machine learning model, a positive prompt and a negative prompt associated with the item information and the animatable element;

generate an item mask by at least removing a background from the item image;

generate, by at least using a second machine learning model, an outpainted image with an outpainted background based at least in part on the item mask, the positive prompt, the negative prompt, and the animatable element;

generate an animation of the outpainted image and a mask animation of the item mask;

generate, by at least using a third machine learning model different from the first machine learning model and the second machine learning model, an animated item video that depicts the item with an animated background based at least in part on the animation of the outpainted image and the mask animation; and include, in a network document, a link to the animated item video such that the animated item video is presented in a presentation of the network document.

2. The computer system of claim 1, wherein the animated item video comprises a plurality of video frames, and wherein the instructions, upon execution, cause the computer system to perform further operations to generate the animated item video by at least:

selecting two adjacent video frames of the plurality of video frames;

generating one or more interpolated video frames based at least on the two adjacent video frames; and inserting the one or more interpolated video frames between the two adjacent video frames.

3. The computer system of claim 1, wherein the instructions, upon execution, cause the computer system to perform further operations to:

generate, by at least using the first machine learning model, a text describing the item based at least in part on the item description; and generate the animated item video that depicts the text.

4. The computer system of claim 1, wherein the instructions, upon execution, cause the computer system to perform further operations to:

generate, by at least using a fourth machine learning model, the animation of the outpainted image with the outpainted background by applying a camera path to the outpainted image; and generate, by at least using the fourth machine learning model, the mask animation by applying the camera path to the item mask.

5. A computer-implemented method, comprising:

generating a first input based at least in part on an image of an item;

causing one or more processors to generate an animation depicting the item using a first machine learning model based at least in part on the first input;

generating a second input based at least in part on the animation and the image of the item; and causing the one or more processors to generate a video depicting the animation of the item with an animated background using a second machine learning model based at least in part on the second input, wherein, for at least one frame of the animated background, the second machine learning model overlays a corresponding item frame of the animation that is unmodified from when the animation was generated.

6. The computer-implemented method of claim 5, further comprising:

causing one or more processors to generate a text prompt using a third machine learning model based at least in part on item information associated with the item;

causing one or more processors to generate an outpainted image using a fourth machine learning model based at least in part on the text prompt; and causing one or more processors to generate the animation using the first machine learning model based at least in part on the outpainted image.

7. The computer-implemented method of claim 6, wherein the text prompt is a first text prompt describing first attributes to depict in the outpainted image, and wherein the method further comprises:

causing one or more processors to generate a second text prompt describing second attributes to not depict in the outpainted image using the third machine learning model; and causing one or more processors to use the fourth machine learning model to generate, based at least in part on the first text prompt and the second text prompt, the outpainted image that depicts the first attributes and does not depict the second attributes.

8. The computer-implemented method of claim 5, further comprising:

generating an outpainted image by:

accessing item information comprising an item image; and causing the one or more processors to outpaint a region of the image outside of a defined image based at least in part on the item image and an image template.

9. The computer-implemented method of claim 5, further comprising:

accessing item information comprising an item description;

causing one or more processors to determine an animatable element associated with the item description and generate a text prompt that describes the animatable element using a third machine learning model; and causing one or more processors to use a fourth machine learning model to generate, based at least in part on the text prompt, an outpainted image that depicts the animatable element.

10. The computer-implemented method of claim 9, wherein the method further comprises:

causing one or more processors to use the second machine learning model to generate, based at least in part on the text prompt and the outpainted image, the video of the item that animates the animatable element.

11. The computer-implemented method of claim 5, further comprising:

accessing item information comprising an item image of the item;

causing the one or more processors to generate an item mask by removing a background from the item image;

causing the one or more processors to select a camera path; and causing the one or more processors to use the first machine learning model to apply the camera path to the item mask to generate an item mask animation.

12. The computer-implemented method of claim 11, further comprising:

causing one or more processors to use the second machine learning model to generate the video depicting the item with the animated background based at least in part on the item mask animation.

13. The computer-implemented method of claim 5, wherein the video comprises a plurality of video frames, and wherein generating the video further comprises:

selecting two adjacent video frames of the plurality of video frames;

generating one or more interpolated video frames based at least on the two adjacent video frames; and inserting the one or more interpolated video frames between the two adjacent video frames.

14. The computer-implemented method of claim 5, further comprising:

causing the one or more processors to generate, by at least using a third machine learning model, a text describing the item based at least in part on item information associated with the item; and causing the one or more processors to generate, by at least using the second machine learning model, the video depicting the text.

15. The computer-implemented method of claim 14, wherein the text is a first text, and wherein generating the text further comprises:

comparing the first text to a database of item descriptions;

detecting a match between the first text and an item description in the database; and causing the one or more processors to discard the first text and generate a second text in response to detecting the match using the third machine learning model.

16. The computer-implemented method of claim 14, further comprising:

causing the one or more processors to generate a text animation by applying a camera path to the text; and causing the one or more processors to generate, by at least using the second machine learning model, the video depicting the text based at least in part on the text animation.

17. The computer-implemented method of claim 5, further comprising:

causing a link to the video to be included in a network document such that the video is presented in a presentation of the network document.

18. A non-transitory computer-readable storage medium storing computer-executable instructions that, when executed by one or more processors, cause operations comprising:

generating a first input based at least in part on an image of an item;

using a first machine learning model to generate an animation depicting the item based at least in part on the first input;

generating a second input based at least in part on the image of the item and the animation; and causing the one or more processors to use a second machine learning model to generate a video depicting the animation of the item with an animated background based at least in part on the second input, wherein, for at least one frame of the animated background, the second machine learning model overlays a corresponding item frame of the animation that is unmodified from when the animation was generated.

19. The non-transitory computer-readable storage medium of claim 18, wherein the instructions, upon execution, cause the one or more processors to use the first machine learning model to generate the animation depicting the item by at least:

selecting a camera path for the animation;

applying a parallax effect to the image of the item to generate a three-dimensional representation of a plurality of pixels depicted in the image of the item; and applying the camera path to the three-dimensional representation of the plurality of pixels depicted in the image of the item.

20. The non-transitory computer-readable storage medium of claim 18, wherein the instructions, upon execution, cause further operations comprising:

generating, by at least using a third machine learning model, a text prompt based at least on item information associated with the item;

generating, by at least using a fourth machine learning model, an outpainted image for the item based at least on the text prompt; and using the first machine learning model to generate the animation depicting the item based at least in part on the outpainted image.

* * * * *